US007030607B2

(12) United States Patent
Ando et al.

(10) Patent No.: US 7,030,607 B2
(45) Date of Patent: Apr. 18, 2006

(54) VARIABLE RELUCTANCE-TYPE RESOLVER

(75) Inventors: Katsuaki Ando, Hekinan (JP); Hiroyuki Takahashi, Okazaki (JP)

(73) Assignees: Favess Co., Ltd, Okazaki (JP); Toyoda Koki Kabushiki Kaisha, Kariya (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/891,231

(22) Filed: Jul. 15, 2004

(65) Prior Publication Data

US 2005/0040816 A1    Feb. 24, 2005

(30) Foreign Application Priority Data

Aug. 18, 2003    (JP)    ............... 2003-207742

(51) Int. Cl.
 *G01B 7/30*    (2006.01)
(52) U.S. Cl. ............................... 324/207.25
(58) Field of Classification Search ............ 324/207.25
 See application file for complete search history.

(56) References Cited

U.S. PATENT DOCUMENTS 5,300,882 A    4/1994    Barros
5,485,046 A *  1/1996    Kaplan et al. ............... 310/166

FOREIGN PATENT DOCUMENTS

EP    0 401 084 A1    12/1990
JP    2002-168652    6/2002

* cited by examiner

*Primary Examiner*—Bot Ledynh
*Assistant Examiner*—Reena Aurora
(74) *Attorney, Agent, or Firm*—Oblon, Spivak, McClelland, Maier & Neustadt, P.C.

(57) ABSTRACT

A variable reluctance-type resolver which does not deteriorate detecting accuracy, and which can fix the rotor to the rotate shaft cheaply is comprised of a stator 5 on which coils 6 are wound, a rotor provided with protrude poles 4a and an annular stopper 10 made of magnetic material. An outer diameter DS of the stopper 10 is selected to be smaller than a valley diameter DR of the rotor 4. Leakage of the magnetic flux from the stator to the stopper is prevented, and the stopper made of the magnetic material can fix the rotor in cheaper way.

6 Claims, 3 Drawing Sheets

(a)

(b)

VARIABLE RELUCTANCE-TYPE RESOLVER

CROSS-REFERENCE TO RELATED APPLICATION

This application based on and claims priority under 35 U.S.C. 119 to Japanese Patent Application No. 2003-207742 filed on Aug. 18, 2003, the entire contents of which are incorporated herein by reference.

BACKGROUND OF THE INVENTION

1. Field of the Invention

The present invention relates to a variable reluctance-type resolver.

2. Description of the Related Art

As a rotation detecting sensor, resolver including coils has been known. For example, variable reluctance-type resolver disclosed in the Japanese Patent Laid-open Publication No. 2002-168 652 comprises a stator on which an excite coil (winding), first detect coil (winding) and second detect coil (winding) are wound, and a rotor having four arch-shaped induct portions protruded radially outwardly.

When the rotor rotates, gap between the induct portions of the rotor and the magnetic poles of the stator on which the coils are wound varies. This gap variation is detected as variation of the reluctance, through the excite signal exciting the excite coil and output signal inducted by the detect coil by a magnetic flux generated by the excite coil. The reluctance variation is detected as rotate angle of the rotor.

In the above variable reluctance-type resolver, when a member made of a magnetic material is disposed near to the rotor, there is fear that a part of the magnetic flux generated by the excite coil flows into a magnetic member disposed near to the rotor. Thus, leakage of magnetic flux may occur. As the magnetic member disposed near to the rotor, a stopper for fixing the rotor to a rotate shaft can be illustrated.

If the magnetic flux leakage occurs, the output signal is not inducted (induced) in the detect coil of the stator accurately, which makes accurate detection of the reluctance variation difficult. In this way, the detect accuracy may be deteriorated. To avoid the magnetic flux leakage, the stopper can be made of a non-magnetic material through which the magnetic flux hardly passes. However, the non-magnetic member more expensive than the magnetic material increases the cost.

SUMMARY OF THE INVENTION

The present invention has been made in view of the above circumstances, and intends to provide the variable reluctance-type resolver which does not suffer from low or poor detecting accuracy resulted from the leak of magnetic flux from the rotor to the stopper, and which can fix the rotor to the rotate shaft in cheaper way.

Inventor of the present invention, as result of hard study for the above object has found, noticing a magnetic resistance being proportional to size of magnetic passage, manner to make the magnetic resistance between the stator and the stopper larger than that between the stator and the rotor.

(1) A variable reluctance-type resolver is comprised of (i) a rotor made of magnetic material, having protrude poles on an outer peripheral surface thereof, and being mounted onto a rotate shaft; (ii) a stator fixed to the rotate shaft radially outwardly of the rotor with leaving a radial gap, and including an excite coil (winding) into which an excite signal is inputted, a detect coil (winding) outputting signal inducted (induced) by magnetic flux generated by the excite coil, and plural magnetic poles made of magnetic material and on which the excite coil and the detect coil are wound; and (iii) a stopper made of magnetic material and mounted onto the rotate shaft adjacent to the rotor in the axial direction to fix the rotor on the rotate shaft.

A gap formed between the stator and the stopper is larger than a gap formed between the stator and the rotor. As a result the magnetic resistance between the magnetic pole of the stator and the outer peripheral surface of the rotor is larger than that between the magnetic pole of the stator and the outer peripheral surface of the rotor. For this reason, the magnetic flux hardly flows from the magnetic pole of the stator to the outer peripheral surface of the stopper.

Despite the stopper made of the magnetic material is used, the magnetic flux generated by the excite coil flows from the inner peripheral surface of the magnetic pole to the outer peripheral surface of the rotor. It further flows from the outer peripheral surface of the rotor to the magnetic pole. Thus, magnetic flux leakage is prevented without deteriorating the detecting accuracy cheaply.

(2) The rotor and the stopper have annular shape, and an outer peripheral contour of the stopper is positioned radially inwardly of an outer peripheral contour of the rotor, when the stopper and the rotor are observed laterally.

An annular gap is formed the rotor and a radially outer side of the stopper about the entire periphery of the stopper and rotor.

The distance from the magnetic pole of the stator to the outer peripheral surface of the stopper is larger than that between the magnetic pole of the stator and the outer peripheral surface of the rotor. For this reason, the sufficient magnetic resistance for preventing the magnetic flux leakage can be secured. In addition, the annular stopper can be worked easily and can be assembled to the rotate shaft easily, which contributes to further decrease of the cost.

(3) An outer diameter of the stopper is equal to or smaller than 99.4% of an outer diameter of a valley portion positioned between the adjacent protruded magnetic poles. In a variable reluctance-type resolver recited in the claim 5, an outer diameter of the stopper is equal to or larger than 88% times of an outer diameter of a valley portion positioned between the adjacent protruded magnetic poles.

Leakage of magnetic flux can be prevented more securely, and the rotor can be fixed to the rotate shaft securely in the axial direction with maintaining strength and rigidity of the stopper.

When outer diameter of the stopper diameter of the rotor is equal to or smaller than 97.4% or 96.4% of the valley diameter, the magnetic flux leakage preventing effect is further increased. However, for maintaining the strength and rigidity of the stopper, the outer diameter is at least 88% of the valley diameter.

(4) An inner peripheral surface defined by the magnetic poles of the stator has constant inner diameter. With such dimensional relation, the predetermined radial gaps are formed between the magnetic pole of the stator, and the stopper or the rotor.

(5) Additionally, following modifications can be adopted. The stopper and the rotor can be constructed separately or integrally. When they are separated, the stopper can be pressed in, adhered to or screwed with the rotate shaft. When they are integral, the stopper and the rotor can be formed by accumulating the silicone steel plates, or by cutting and grinding the magnetic material such as iron steel. The numbers of members can be decreased, the working and assembling becomes easily. Thus, further decrease of the cost can be performed. In both of the stopper and the rotor being separate and integral, the stopper can be disposed at only one lateral side of the rotor, or at both sides thereof.

The variable reluctance-type resolver of the present invention can be applied, for example, to a power steering apparatus mounted to the vehicle. In addition, it can be applied to the apparatus which needs the rotate angle information, such as a transmit ratio variable steering apparatus.

BRIEF EXPLANATION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

PREFERRED EMBODIMENT

In the following, preferable embodiment of the present invention will be explained with reference to attached drawings. However, it is noted that the present invention should not be limited to this embodiment.

(Construction)

In this embodiment, the present invention is applied to an electrical power steering apparatus of a vehicle. As well known, in the power steering apparatus, a steering torque applied to a steering wheel is detected, and required steering assist torque corresponding to the steering torque is generated by the motor to assist the steering. The power steering apparatus comprises a steering wheel, torque sensor for detecting the steering torque, motor for generating the steering assist torque, control device for controlling the motor based on information from the torque sensor, and torque transmit mechanism for transmitting torque from the steering wheel and the motor to the steered wheel (tire).

The variable reluctance-type resolver (referred simply "resolver" hereinafter) of this embodiment is assembled into the brushless motor which does not have brush and commutator, detects the information such as rotate angle of a rotate shaft 3 etc. necessary for driving the motor. The detected information is outputted to the control device.

Figure 1:
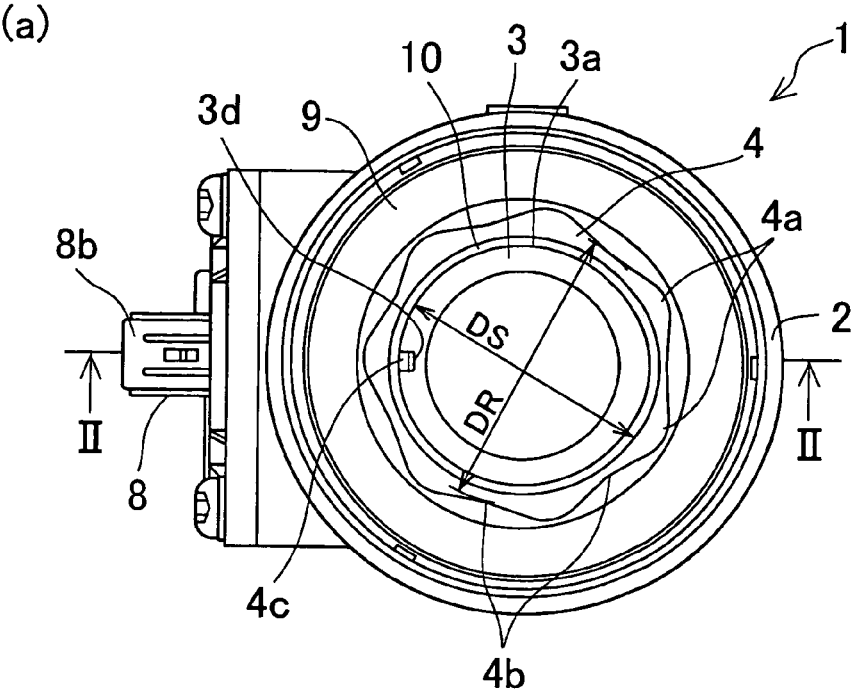
FIG. 1(a) is a plane view of the variable reluctance-type resolver.
FIG. 1(b) is a plan view of the variable reluctance-type resolver from which a cover is removed.
Figure 1:
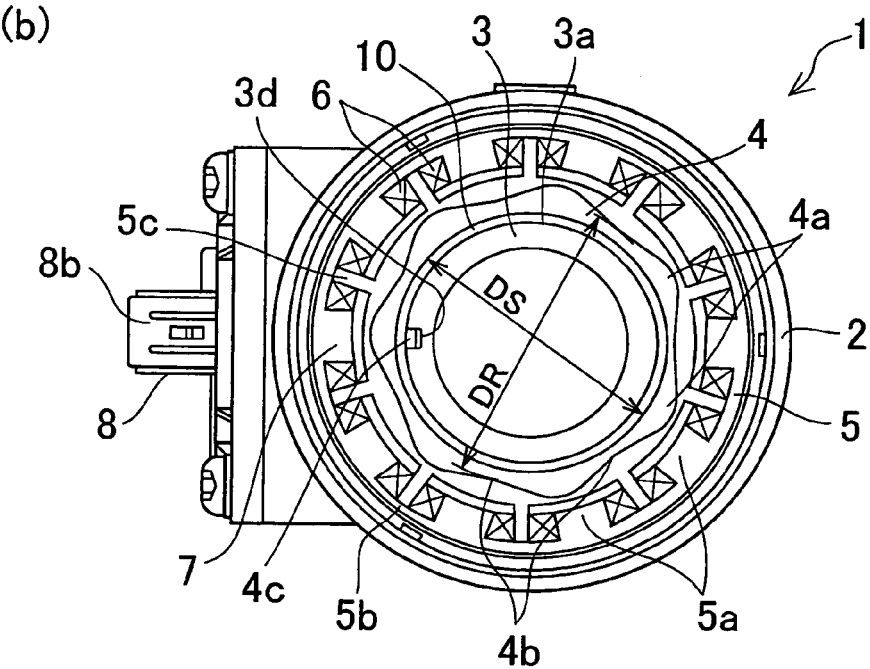
Figure 2:
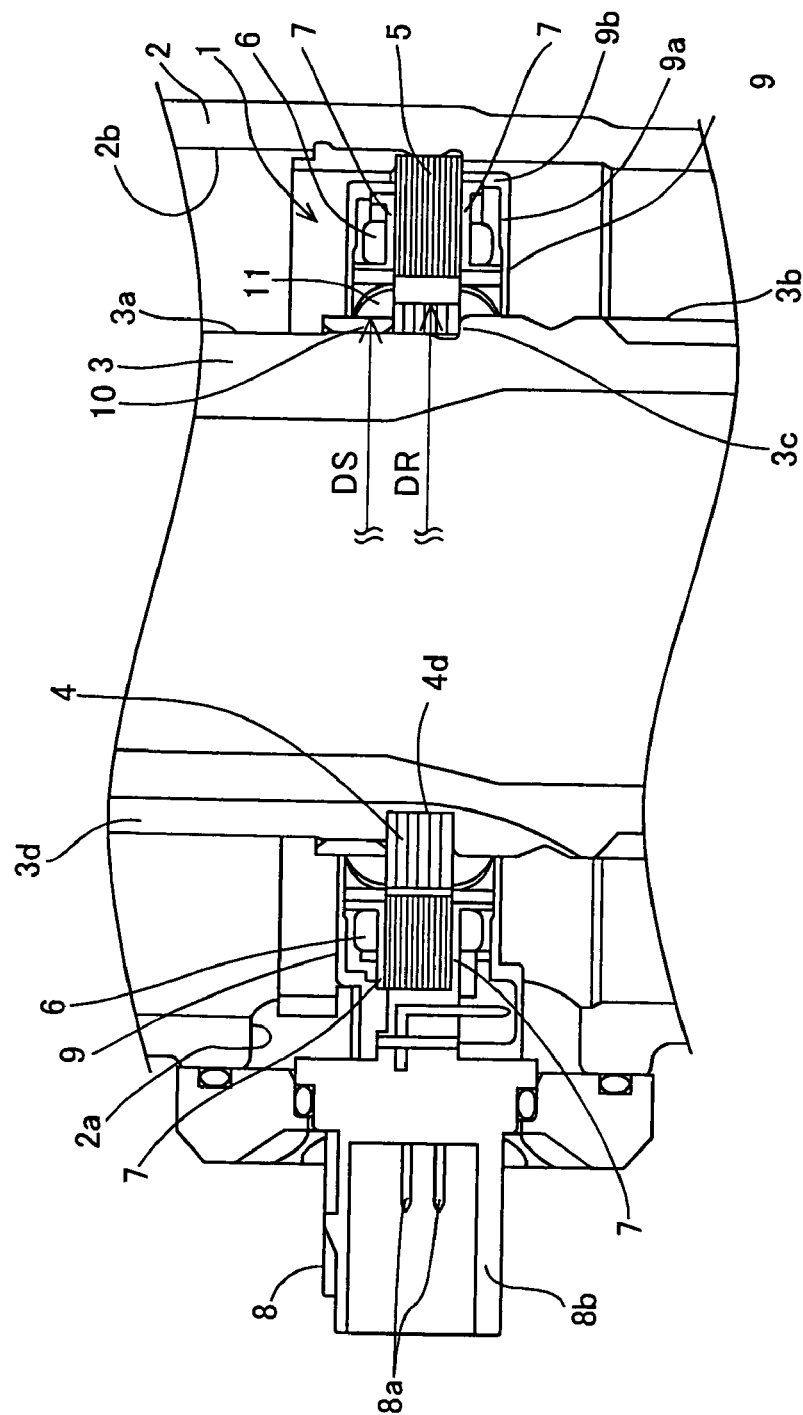
FIG. 2 is a cross-sectional view along line II—II in FIG. 1(a)
Figure 3:
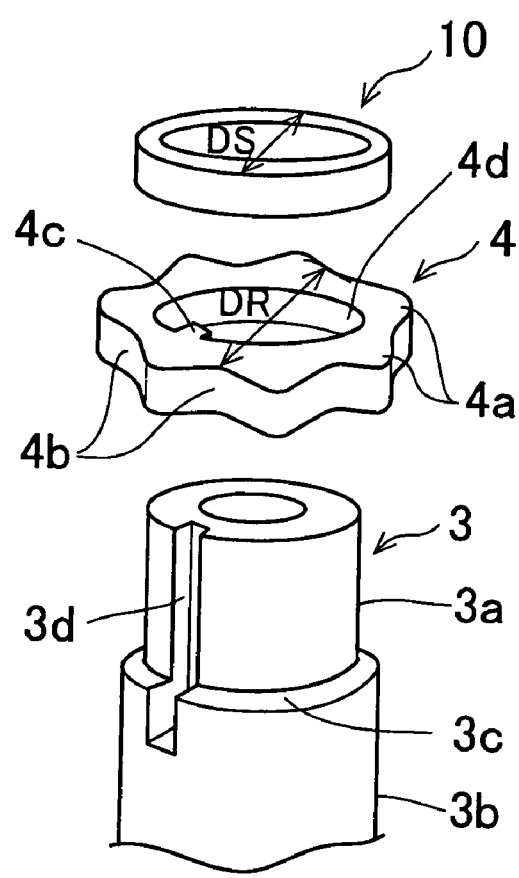
FIG. 3 is a perspective view shown of the rotate shaft, the rotor and the stopper of the variable reluctance-type resolver.

The resolver is shown in FIGS. 1 to 3, in which FIG. 1(a) is a plan view of the resolver, and FIG. 1(b) is a plan view of the resolver from which a cover is removed; FIG. 2 is a cross-sectional view shown along line II—II in FIG. 1(a); and FIG. 3 is a perspective view of the rotate shaft, the rotor and the stopper.

Firstly, detail construction of the resolver will be explained with reference to FIGS. 1 and 2, and FIG. 3 is referred as occasion demands. As shown in FIGS. 1 and 2, the resolver 1 is comprised of a housing 2, the rotate shaft 3, a rotor 4, a stator 5 opposed to the rotor with leaving an radial gap, and a stopper 10 for fixing the rotor 4 to the rotate shaft 3.

The housing 2 made of aluminum and having a cylindrical shape is formed integral with the housing (not shown) of the motor. It is provided with a throughhole 2a at predetermined part in the axial and circumferential directions.

The rotate shaft 3 is made of an iron steel which is one kind of the magnetic material, and has hollow shape. It is rotatably supported by the housing 2 of the motor via bearings (not shown). A small diameter portion 3a, a large diameter portion 3b, and a ring-shaped step portion 3c located therebetween are formed on the rotate shaft 3. At predetermined part in the circumferential direction, an axial groove 3d extending over the small diameter portion 3a, step portion 3c and the large diameter portion 3b is formed. The rotate shaft 3 is formed integral with a rotate shaft of the motor, and rotates integral therewith.

The rotor 4 is constructed by laminating silicone steel plates which are one kind of the magnetic material and having a ring shape, and is mounted on an outer peripheral surface of the rotate shaft 3. In detail, on an inner surface of a through hole 4d formed at center of the rotor 4 for allowing penetration of the rotate shaft 3, a protrusion 4c protruding radially inwardly is formed. When the rotor 4 is mounted onto the rotate shaft 3, the protrusion 4c and the groove 3d are aligned in the axial direction. Then, the rotor 4 is slid axially on the rotate shaft 3 until one end surface of the rotor 4 abuts onto the step portion 3c of the rotate shaft 3. Thus, the circumferential and axial position of the rotor 4 relative to the rotate shaft 3 is determined.

On an outer peripheral surface, plural (here, seven) protrude poles 4a each having an arch-shape and protruding radially outwardly are formed by the constant interval. Between the adjacent protrude poles 4a, a valley portions 4b are formed. That is, the protrude poles 4a and the valley portions 4b are formed alternately in the circumferential direction. Here, twice of distance from a center of the rotor 4 to a part on the valley portion 4b nearest to the center, is defined as valley diameter DR.

The stator 5 is constructed by laminating silicone steel plates which are one kind of the magnetic material and having a ring shape. It is fixed to an inner peripheral surface 2b of the housing 2 to be positioned coaxially with , and at axially same position with the rotor 4. Plural (here, ten) magnetic poles 5a and the annular yoke 5b connecting the adjacent magnetic poles 5a at radially outer portion are formed. The magnetic poles 5a and the yokes 5b, together with the rotor 4, form the magnetic circuit through which the magnetic flux generated by the coil 6 flows. The plural magnetic poles 5 and the yoke 5b form plural (here, ten) slots 5c which receive the coil 6. An inner peripheral surface defined by the plural magnetic poles 5a has constant inner diameter.

Around each of the plural magnetic poles 5a of the stator 5, the coil 6 is wound. It is constructed by an excite coil into which an excite signal is inputted, and a detect coil for outputting the signal inducted by the magnetic flux generated by the excite coil.

On an upper and lower surfaces of the stator 5 etc., an insulate member 7 made of resin is disposed for preventing short circuit between the stator 5 and the coil 6. It covers an inner peripheral surface of each of the plural slots 5c, and both end surfaces of the stator 5.

A connector 8 for connecting the coil 6 to the control device electrically is fixed on an outer peripheral surface of the stator 5. It is provided with terminals 8a and a housing 8b. The terminals 8a are connected with the excite coil and the detect coil of the coil 6, and the housing 8b is to be engaged with a connect portion of the control device.

A resin cover 9 for preventing attachment of the foreign matter to the magnetic pole 5a and the coil 6 wound thereon is disposed to cover the both end surfaces of the stator 5. It has an annular end plate 9a and a cylindrical wall 9b extended from an outer periphery of the end plate 9a. To avoid interference with the inner peripheral surface of the housing 2, the cylindrical wall 9b is disposed nearer to center than the outer peripheral of the stator 5, in the radial direction 5. The end of the cylindrical wall 9b is fixed to the yoke 5b of the stator 5 and the housing 8b of the connector 8.

An outer peripheral surface of the stator 5 is adhered to the inner peripheral surface 2b of the housing 2, and stator 5 is fixed to the housing 2 by the connector 8 inserted into the throughhole 2a formed on the housing 2.

The stopper 10 is made of iron steel which is one kind of the magnetic material and has the ring shape. The inner diameter of the stopper 10 corresponds to sum of the outer diameter of the rotate shaft 3 and the press-in interference. The stopper 10 is pressed into the rotate shaft 3 into which the rotor 4 is pressed in, up to the predetermined position, so that the rotor 4 is abutted to the step portion 3c of the rotate shaft 3.

The outer diameter DS of the stopper 10 is smaller than the valley diameter DR of the rotor 4. Concretely, the outer diameter DS of 50 mm is smaller than the valley diameter DR of 50.35 mm. DS corresponds to 99.4% of DR. In other words, as apparent from FIGS. 1(*a*) and (*b*), an outer peripheral contour (outline) of the stopper 10 fixing the rotor 4 to the rotate shaft 3 is positioned radially inwardly relative to the outline of valley portion of the rotor 4. Consequently, an annular space 11 is formed at one axial side of the rotor 4 and radially outward side of the stopper 10.

(Operation and Advantage)

Next, the operation and advantage of the embodiment will be explained.

The excite signal is inputted from the control device to the resolver 1 through the connector 8, so that the excite coil of the coil 6 wound on the magnetic pole 5a of the stator 5 generates the magnetic flux. This magnetic flux flows from the inner peripheral surface of the magnetic pole 5a of the stator 5 on which the excite coil of the coil 6 is wound, via the gap, to the outer peripheral surface of the rotor 4 opposed to the stator 5, radially inwardly. Further, it flows from other peripheral surface of the rotor 4, via the gap, to the magnetic pole 5a of the stator 5 on which the detect coil of the coil 6 is wound and which opposes to the rotor 4, radially outwardly.

The output signal inducted by the detect coil of the coil 6 by the flux generated by the excite coil is outputted to the control device through the connector 8. The control device receives the excite signal for exciting excite coil of the coils 6 and the output signal that is induced in the detect coil of the coils 6 by the magnetic flux of the excite coil. Then, the control device detects variation of the reluctance depending on the excite signal and the output signal. Variation of the reluctance is detected as the rotate angle.

The control device, based on the rotate angle, controls the current to the motor to generate torque by the motor. Here, distance from the magnetic pole 5a of the stator 5 to the outer periphery of the stopper 10 is larger than distance from the magnetic pole 5a to the outer peripheral surface of the rotor 4 opposed thereto in the whole area in the circumferential direction. As mentioned above, value of the magnetic resistance corresponds to size of the gap.

As a result, the magnetic resistance between the magnetic pole 5a of the stator 5 and the outer periphery of the stopper 10 is larger than the magnetic resistance between the magnetic pole 5a and the outer periphery of the rotor 4. This difference makes magnetic flux leakage in the axial direction from the magnetic pole 5a of the stator 5 to the outer peripheral surface of the stopper 10 difficult.

The relation between material of the stopper 10 and that of the electrical angle error will be explained. When the stopper 10 made of the non-magnetic material is used, the electrical angle error in the electrical angle of the variable reluctance-type resolver 1 is 23.62 minutes. On the other hand, the rotate angle error when the stopper 10 made of the magnetic material (iron steel) according to the present invention is 24.37 minutes. As apparent, the rotate angle error in the latter case is larger than the former case by 0.75 minutes.

However, this difference is smaller than the acceptable measuring error (2 to 3 minutes) existed in the measure device, and does not affect the rotate angle measurement substantially. For this reason, the stopper 10 made of the magnetic material does not worsen the detect accuracy. In addition, the stopper 10 can fix the rotor 4 to the rotate shaft 3 in cheaper way.

Having now fully described the present invention, it will be apparent to one of ordinary skill in the art that many changes and modifications can be made thereto without departing from the spirit or scope of the present invention as set forth herein including the appended claims.

What is claimed is:

1. A variable reluctance-type resolver, comprising;
    a rotor made of magnetic material, having protruding poles on an outer peripheral surface thereof, and being mounted onto a rotatable shaft;
    a stator fixed coaxial with the rotor with leaving a radial gap, and including an excite coil into which an excite signal may be inputted, a detect coil outputting a signal induced by magnetic flux generated by the excite coil, and plural magnetic poles made of magnetic material and on which the excite coil and the detect coil are wound; and
    an annular stopper made of magnetic material and mounted onto the rotatable shaft adjacent to the rotor in the axial direction to fix the rotor on the rotatable shaft, wherein a gap formed between the stator and the stopper is larger than a gap formed between the stator and the rotor.

2. A variable reluctance-type resolver according to claim 1, wherein the rotor has an annular shape, and an outer peripheral contour of the stopper is positioned radially inwardly of an outer peripheral contour of the rotor, when the stopper and the rotor are observed laterally.

3. A variable reluctance-type resolver according to claim 2, wherein the annular gap extend, about the entire circumference of the stopper and rotor.

4. A variable reluctance-type resolver according to claim 3, wherein an outer diameter of the stopper is not more than 99.4% of an outer diameter of a valley portion positioned between the adjacent protruded magnetic poles of the rotor.

5. A variable reluctance-type resolver according to claim 4, wherein an outer diameter of the stopper is not less than 88% of an outer diameter of a valley portion positioned between the adjacent protruded magnetic poles of the rotor.

6. A variable reluctance-type resolver according to claim 5, wherein an inner peripheral surface defined by the pole portions of the stator has a constant inner diameter.

* * * * *